United States Patent [19]
Boswell et al.

[11] Patent Number: 5,166,257
[45] Date of Patent: Nov. 24, 1992

[54] MODIFIED ROSIN ESTERS AND THEIR USE IN PRINTING INKS

[75] Inventors: Henry G. Boswell; John H. Thomas; Richard C. Houser, all of Jacksonville; Joseph W. LeVine, Panama City, all of Fla.

[73] Assignee: Westvaco Corporation, New York, N.Y.

[21] Appl. No.: 787,269

[22] Filed: Nov. 4, 1991

Related U.S. Application Data

[62] Division of Ser. No. 658,208, Feb. 19, 1991.

[51] Int. Cl.$^5$ .............................................. C08G 63/48
[52] U.S. Cl. ................................ 524/576; 525/54.44; 525/54.45
[58] Field of Search .......................... 525/54.44, 54.45; 524/576

[56] References Cited

U.S. PATENT DOCUMENTS 4,002,585  1/1977  Oishi et al. ...................... 525/54.44
4,322,326  3/1982  Pyle ................................. 525/54.44

Primary Examiner—Bernard Lipman
Attorney, Agent, or Firm—Terry B. McDaniel; Daniel B. Reece, IV; Richard L. Schmalz

[57] ABSTRACT

A binder for use in gravure printing ink formulations comprising a modified rosin ester resinate prepared by forming a rosin-dienophile adduct, reacting the adduct with a polyfunctional hydroxy compound to form an ester and reacting with an acrylic-containing polymer to form a hard rosin ester. The polymer-modified rosin ester resinate is formed by reacting the prepared hard rosin ester with a rosin-dienophile adduct and an acrylic-containing polymer, reacting the product thereof with reactive zinc, followed by a reaction with lime, dehydrating the resinate product by refluxing, and adjusting its viscosity with a hydrocarbon solvent.

4 Claims, No Drawings

MODIFIED ROSIN ESTERS AND THEIR USE IN PRINTING INKS

This is a division of application Ser. No. 07/658,208, filed Feb. 19, 1991.

BACKGROUND OF THE INVENTION (1) Field Of The Invention

The present invention relates to rosin ester resins modified with a hydroxy functional polymer, such as an acrylic polymer. More specifically, this invention relates to acrylic polymer modified esters of rosin, methods for preparing the modified rosin, as well as the use of an acrylic polymer modified rosin ester in vehicles for gravure printing inks.

(2) Description Of The Prior Art

Modified rosins have come into widespread use as binders in vehicles for gravure printing inks However, these inks are usually quite costly. In addition, with the development of the printing arts, the speeds of printing have become increasingly high, and requirements for various ink properties such as gloss, drying properties, blocking holdout, firm formation, film toughness (resistance to abrasion), reducibility and printability, color development, resistance to static movement or rub are of primary importance to the resin supplier. All of these properties are affected by the resin or binder used to formulate these inks.

Prior to this invention rosins have been modified with one or more (in succession) or with a combination of dienophiles, and/or with phenolic resins and often followed by esterification in attempts to produce tougher, glossier inks that are resistant to rub The beneficial product characteristics provided by rosin esters for various uses have led to the development of many esterification procedures, particularly treatments with polyhydric alcohols U.S. Pat. Nos. 2,369,125 to Jones, et al. and U.S. Pat. Nos. 2,572,086 and 2,590,910 each to Wittcoff, et al. teach rosin esterification with glycerol and pentaerythritol, among other polyhydric alcohols.

In U.S. Pat. No. 2,478,490 to Krumbhaar, there is disclosed rosin-modified, phenol/formaldehyde resins containing rosin esterified by polyhydric alcohols and reinforced by polybasic acids of the maleic type which are useful in printing inks. These rosin-modified phenol/formaldehyde resins and rosin-modified maleic esters are prepared by heating rosin together with phenol/formaldehyde condensates, with maleic-type polybasic acids, or both, and subsequently esterifying with polyhydric alcohol.

Japanese Patent 62-265,376 to Toray Ind. discloses printing ink compositions containing rosin modified phenolic resins with a polyfunctional acrylate. The Japanese patent does not disclose a modified resin that has been esterified. U.S. Pat. No. 4,693,846 to Piccirilli, et al. discloses a urethane-modified dimerized rosin ester for use in lithographic printing inks and coatings There exists a need in the art of gravure printing for an ink which is inexpensive and exhibits good properties in such parameters as film toughness (resistance to abrasion), blocking, color development, gloss, resistance to static movement or rub, high hold out and excellent printability when printed on a given substrate. All of these properties are affected by the resin or binder used to formulate the ink.

Accordingly, it is a primary object of this invention to provide rosin resins and resinates which produce superior gravure printing inks and avoid unsatisfactory physical properties.

Another object of this invention is to provide improved modified rosin resins and resinates for use in printing ink formulations.

Yet another object of this invention to provide a process for making modified rosin resins and resinates which are particularly useful as a component of printing ink vehicles.

It is a further object of this invention to provide a gravure printing ink containing a modified rosin or resinate as a binder which exhibits improved film toughness, gloss and Sutherland rub.

Other objects, features and advantages of the invention will be apparent from the details of the invention as more fully described and claimed.

SUMMARY OF THE INVENTION

The present invention is a modified rosin prepared by forming an adduct of rosin and a dienophile, reacting the rosin adduct with a polyfunctional hydroxy compound to form an ester and reacting the ester with an acrylic-containing polymer to form a hard resin. In an alternative embodiment, a resinate is formed from the hard resin intermediate by blending the reaction product of a rosin adduct, a copolymer, and the hard resin, followed by reaction with zinc in a hydrocarbon solvent. The present invention also includes a gravure printing ink having a vehicle comprising, as the binder, a modified rosin ester resin or resinate of this invention in a hydrocarbon solvent and a pigment dispersed therein.

It has been found that the gravure printing ink formulations in accordance with this invention have significant increases in rub resistance, abrasion and high gloss, and provide quality printing.

DETAILED DESCRIPTION OF THE INVENTION

The rosins employed in this invention may be tall oil rosin, gum rosin, or wood rosin. Rosin is mainly a mixture of $C_{20}$, fused-ring, monocarboxylic acids, typified by levopimaric and abietic acids, both of which are susceptible to numerous chemical transformations.

Tall oil rosin is isolated from crude tall oil obtained by acidulation of the "black liquor soap" skimmed off the concentrated alkaline digestion liquor washed out of paper pulp in the kraft, i.e. sulfate, pulping process for making paper. Fractionation of the crude tall oil yields tall oil rosin and fatty acids. The tall oil rosin used in this invention generally contains at least about 80% rosin acids, preferably at least about 85% to 88% rosin acids, and most preferably about 95% to 97% rosin acids. It should be understood, however, that the invention contemplates the use of tall oil rosin having rosin contents much lower, for example, about 30% rosin acids. The remaining material is fatty acids and unsaponifiable material.

Gum rosin is produced by the nature separation and gradual conversion of some of the hydrophilic components of sap and related plant fluids from the cambium layer of a tree into increasingly hydrophobic solids. Pine gum contains about 80% gum rosin and about 20% turpentine.

Wood rosin is obtained by resinification of oleoresin from either natural evaporation of oil form an extrudate or slow collection in ducts in sapwood and heartwood. Pine tree stumps are valuable enough to be extracted with hexane or higher-boiling paraffins to yield wood rosin, wood turpentine, and other terpene-related compounds by fractional distillation.

To produce the hard resin intermediate for resinate production, rosin is charged to a reactor and heated until melted, usually about 180° C. The reaction can be conducted in a vessel properly equipped with a thermometer, stirrer, and a distillation column to separate water that distills form reactants, and, optionally, a Dean-Stark trap. The molten rosin is agitated as soon as the melting process makes it possible, and agitation is continued throughout the process.

A dienophile is added to the molten rosin, and the mixture is heated to cause a Diels-Alder (cycloaddition) reaction between the dienophile and the rosin. The preferred dienophiles for reaction with the rosin component are fumaric acid, maleic acid, acrylic acid, methacrylic acid, itaconic acid, citraconic acid and maleic anhydride. It is possible to substitute other dienophiles therefor although they are less preferred. Preferably, the dienophiles are used in an amount of from about 3% to about 20% by weight of rosin and, more preferably, comprises from about 5% to about 15% by weight of rosin.

The reaction temperature should be in the range of between the melting point of the rosin and the boiling point of the dienophile. Thus, the optimum reaction temperature will be selected depending upon the rosin and the dienophile used, generally from about 150° C. to about 250° C., with from about 200° C. to about 210° C. being preferred. Heating is continued until a rosin adduct is produced having an acid number of from about 210 to about 220, which usually takes from about 1 to about 3 hours. The reaction may be carried out under a blanket of inert gas, such as nitrogen.

Upon completion of the reaction, the rosin adduct is reacted with a polyfunctional alcohol and the acrylic-containing polymer to form a modified rosin ester resin.

The rosin adduct is also reacted with an acrylic-containing polymer. Typical acrylic-containing polymers include a polymer mixture of acrylic acid, methacrylic acid, or one or several of their organic ester derivatives, and a member selected from the group consisting of styrene, alpha methyl styrene, ethylene vinyl acetate, and a combination thereof. A preferred polymer is styrene-acrylic polymer, such as Joncryl® 587, available from S. C. Johnson. Generally, from about 10% to about 50% by weight of the acrylic-containing polymer, preferably from about 20% to about 40%, is reacted The reaction can be conducted most successfully at temperatures of 200° C. to 300° C., preferably about 200° C. to about 210° C., until a desired acid value and/or hydroxyl value is attained Lower temperature can be employed, but the rate of reaction will be slowed thereby Also, higher temperature can be employed, but temperatures above the point at which distillation of reactants or the final product result will affect yield deliteriously. Solvents such as azeotropic solvents such as toluene or xylene or high boiling hydrocarbons can be employed. Catalysts such as condensation catalysts, e.g., dibutyltin oxide or butyl stannoic acid, can also be employed in the reaction. The reaction can be conducted in a vessel properly equipped with a thermometer, stirrer, a distillation column to separate water that distills from reactants, and, optionally, a Dean-Stark trap.

In the preparation of the rosin esterification product, polyfunctional hydroxy compounds are reacted with the rosin adduct The polyfunctional hydroxy compounds useful herein are preferably polyhydric alcohols. The polyhydric alcohols are preferably high functional polyols. By high functional polyols, it is meant those polyols containing more than two hydroxyl groups which will react with the acid functional reactants to produce rosin esters having high softening points and good dilutability with hydrocarbon solvents. The polyol may contain substituents, provided that the substituents do not adversely affect the reaction of the polyols or the performance of the resultant products. Illustrative examples of these polyols are monoor polypentaerythritol such as di- or tri-pentaerythritol. Other examples of the useful polyols are trimethylolpropane, trimethylolethane, glycerine and the like. Useful polyfunctional alcohols include those alcohols containing at least one hydroxyl group and another functional group that can react with the acid functional group of the rosin.

In the preparation of the hydroxyl-functional esterification product, the particular reactants and reaction conditions that are used will dictate the particular ratio of reactants The reactants are employed in such a ratio that the resultant esterification product is hydroxyl-functional. Typically, the equivalent ratio of the acid functional reactant to the polyol can be from about 0.8:1.2 to 1:1.2.

The polyfunctional hydroxy compound and a defoamer, if needed to preclude excessive foaming, is charged to the reaction vessel by mixing the polyfunctional hydroxy compound with the catalyst and dividing the mixture into several equivalent portions which are added uniformly over a limited time period while the temperature in the reaction vessel is held above about 180° C., preferably above about 185° C. After addition of the polyfunctional hydroxy 8compound and, optionally, an alkaline catalyst, the reaction vessel is heated to from about 200° C. to about 275° C., preferably about 200° C. to about 210° C., uniformly over a period of about three hours. This heating is designed to maximize the esterification of the rosin resin. Uniform heating minimizes sublimation of the polyfunctional hydroxy compound. Heating is continued at the same temperature until an acid number of 155 is reached.

The resultant polymer TM modified ester of rosin generally has good dilutability in appropriate hydrocarbon solvents. The physical properties of the modified rosin ester resin made by the process of the present invention include:

| Acid Number | 145-155 |
| Melt Point (°C.) | 110-120 |
| Viscosity (50% in Toluene) | P-T (Gardner scale) |
| Color (50% in Toluene) | 10 max. |

The invention resinate is formed by making a rosin-dienophile adduct, preferably by heating the rosin with maleic anhydride at about 160° C. for an hour. Paraformaldehyde may be added to accelerate the reaction.

To the rosin-dienophile adduct are added an acrylic-containing copolymer, in an amount from about 10% to about 50% by weight of rosin adduct, and the polymer-modified ester of rosin prepared above, in an amount from 2% to about 10% by weight of rosin adduct, and the mixture is blended.

The blend is reacted with a slurry of a reactive zinc compound dissolved in a hydrocarbon solvent. Suitable reactive zinc compounds include metallic zinc or oxides or hydroxides of zinc. The reaction temperature depends upon the rosin adduct and the reactive zinc compound, generally at under reflux or at temperatures from about 200° to about 280° C. The reaction can be accelerated using a catalyst, such as, dibutyltin oxide or butyl stannoic acid. The desirable amount of the zinc compound, based on the adduct, is the reaction equivalent or less. Generally, from about 2% to about 8% by weight, particularly from about 4% to about 7% by weight, based on the weight of the rosin adduct of zinc is reacted. It should be understood that magnesium oxide and/or calcium hydroxide (lime) may replace part or all of the zinc in this reaction. Hydrocarbon solvents, such as those generally used as vehicles in printing inks may be used to form the hydrocarbon slurry.

Another aspect of this invention is to form a solution rosin resinate utilizing the good dilutability characteristics of the modified rosin ester resinate. A convenient method is to dissolve the resinate into a hydrocarbon solvent, such as benzene, toluene, xylene, and mixtures thereof, in situ. The amount of hard resin which will dissolve will vary depending upon the solvent used.

The resinates of this invention generally have good dilutability in hydrocarbon solvents and, preferably, exhibit the following properties:

| | |
|---|---|
| Bulk Viscosity 25° C. | (Brookfield, Cps) 2000–4000 |
| Color, Gardner | 10–17 |
| % Non-Volatiles | 45–65 |
| Gardner Viscosity, 25° C. | R-Z2 |
| Melt Point, °C. | 170–235 |
| Acid Number | 40–70 |

The printing inks formulated in accordance with the present invention include the modified rosin ester resinate dissolved in an organic solvent as the printing ink vehicle. These printing inks are made in the same manner as conventional printing inks except the resin of the present invention is employed in the ink vehicle. Optionally, the inks may include other ingredients which are typically used in printing inks. The pigments used in the printing inks are well-known to those of ordinary skill in the printing art.

The ink compositions generally are prepared by dispersing, pigment, clay, hydrocarbon solvent, metalated resinate, lecithin and a small amount of an organic compound in a mill. This dispersion is reduced with a mixture of conventional resinate, cellulose, alcohol solvent, hydrocarbon solvent, and the resin vehicle of the present invention to produce an excellent printing ink particularly suitable for use in publication gravure printing.

The most common mixing ratio of the vehicle, pigment and reinforcing filler is as follows:

| | Desirable Extent | Optimum Extent |
|---|---|---|
| Vehicle (wt. parts) | 60–97 | 80–90 |
| Pigment (wt. parts) | 3–40 | 10–20 |

The mixing ratio may be varied according to the use of the ink, so that the present invention is not intended to be limited to the above ranges.

These resin/resinates when used as either grind-type or let down-type vehicles, or both, in inks offer significant increases in rub, abrasion, and gloss with no detriment to other pertinent properties of the ink film. Abrasion resistance, as measured on a Taber Abrasion Tester, may increase by 200–300% when used at equal amounts against more conventional resin/resinates. Sutherland Rub Test also shows increases of 50–100% with 10% increase in gloss as well as equal blocking.

The following examples are provided to further illustrate the present invention and are not to be construed as limiting the invention in any manner. All parts are parts by weight unless otherwise stated.

EXAMPLE 1

A hard resin precursor was formed by adding to a suitable reaction kettle under a nitrogen blanket, 10,000 pounds of tall oil rosin The rosin was heated to 170° C. and the nitrogen turned off, at which time 1,000 pounds fumaric acid was added. The reaction mixture was heated at 210° C. for about two hours (until a clear pill was formed) to form a complete rosin adduct To the rosin adduct was added 150 ml of DCA Antiform and 3,350 pounds of acrylic-styrene polymer (Joncryl 587) and the heat maintained for 15 minutes. Four pounds of lime was added and the mixture held at 195° C. for one hour. Two hundred pounds of glycerine was added and heating continued at 205° C. until an acid number of 155 was reached.

EXAMPLE 2

A resinate modified with a modified rosin resin was produced by reacting rosin and maleic anhydride at 160° C. for one hour in the presence of a small amount of paraformaldahyde to accelerate the reaction. To the maleic rosin adduct, dissolved in toluene, was blended an ethylene vinyl acetate copolymer and 5% by weight of the hard resin precursor from Example 1. This mixture was cooled to 90° C. and a slurry containing ZnO/MgO was reacted, followed by reaction with lime to form the invention resinate The temperature of the resinate was increased to reflux, and the resinate dehydrated. The physical properties of this product are:

| | |
|---|---|
| Color, Gardner | 12–13 |
| Dilution | 102 ml/100 gm |
| % Non-Volatile | 48 |
| Gardner Viscosity, 25° C. | Z-Z1 |
| Melt Point, °C. | 190 |

The solution resinate of Example 2 was tested for rub, abrasion, and gloss with no detriment to other pertinent properties of the ink film. Abrasion resistance was measured on a Taber Abrasion Tester and increased 200–300% when used at equal amounts against more conventional resin/resinates. Sutherland Rub Test also showed increases of 50–100% with 10% increase in gloss as well as equal blocking.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

That which is claimed is:

1. A polymer-modified rosin ester resinate comprising the reaction product of: a rosin-dienophile adduct prepared as the product of a reaction of a rosin selected from the group consisting of tail oil rosin, wood rosin, and gum rosin and a dienophile selected from the group consisting of fumaric acid, maleic acid, maleic anhydride, acrylic acid, methacrylic acid, citraconic acid, and itaconic acid; an acrylic polymer a selected from the group consisting of mixtures of a polymer of acrylic acid, organic ester derivatives of acrylic acid, methacrylic acid, organic ester derivatives of methacrylic acid, mixtures thereof, and a member selected from the group consisting of styrene, alpha methyl styrene, ethylene vinyl acetate, and a combination thereof and a polymer-modified rosin ester comprising the reaction product of the rosin-dienophile adduct, a polyfunctional hydroxy compound, and the acrylic-containing polymer; a member selected from the group consisting of reactive zinc, magnesium oxide, lime, and mixtures thereof; and a hydrocarbon solvent.

2. The polymer-modified rosin ester resinate of claim 1 wherein the reactive zinc is present in an amount from about 2% to about 10% by weight based on the polymer-modified rosin ester.

3. The polymer-modified rosin ester resinate of claim 1 wherein the hydrocarbon solvent is selected from the group consisting of benzene, toluene, xylene, and mixtures thereof.

4. The polymer-modified rosin ester resinate of claim 1 wherein the resinate has a melting point greater than 170° C., an acid number between 40 and 70 and a Brookfield viscosity at 25° C. of 2000 to 4000 cps.

* * * * *

UNITED STATES PATENT AND TRADEMARK OFFICE
CERTIFICATE OF CORRECTION

PATENT NO. : 5,166,257

DATED : November 24, 1992

INVENTOR(S) : Henry G. Boswell, et al

It is certified that error appears in the above-indentified patent and that said Letters Patent is hereby corrected as shown below:

In column 1, line 19, after inks, insert --.--

In column 1, line 34, after rub, insert --.--.

In column 1, line 38, after alcohols, insert --.--.

In column 3, line 9, delete "form" and substitute therefor --from--.

In column 3, line 55, after attained, insert --.--.

In column 3, line 57, after thereby, insert --.--.

In column 4, line 3, after adduct, insert --.--.

In column 4, line 14, delete "monoor" and substitute therefor --mono-or--.

In column 4, line 25, after the first occurrence of reactants, insert --.--.

UNITED STATES PATENT AND TRADEMARK OFFICE
CERTIFICATE OF CORRECTION

PATENT NO. : 5,166,257
DATED : November 24, 1992
INVENTOR(S) : Henry G. Boswell, et al It is certified that error appears in the above-indentified patent and that said Letters Patent is hereby corrected as shown below:

In column 4, line 47, delete "polymer TM modified" and substitute therefor --polymer-modified--.

In column 6, line 19, after adduct, insert --.--.

In column 6, line 38, after resinate, insert --.--.

In Claim 1, column 7, line 1, delete "tail" and substitute therefor --tall--.

In Claim 1, column 7, line 5, delete "a".

Signed and Sealed this

Twenty-sixth Day of October, 1993

Attest:

BRUCE LEHMAN

Attesting Officer    Commissioner of Patents and Trademarks